United States Patent
Burkhart et al.

(10) Patent No.: US 7,516,405 B2
(45) Date of Patent: Apr. 7, 2009

(54) DISPLAYING HELP RESOURCES

(75) Inventors: Michael John Burkhart, Round Rock, TX (US); Daniel G. Eisenhauer, Austin, TX (US); Daniel Mark Schumacher, Pflugerville, TX (US); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/755,822

(22) Filed: Jan. 12, 2004

(65) Prior Publication Data

US 2005/0154985 A1    Jul. 14, 2005

(51) Int. Cl.
 *G06F 3/00* (2006.01)
(52) U.S. Cl. .................................. 715/705; 455/414.3
(58) Field of Classification Search .............. 455/414.3; 715/526, 705
See application file for complete search history.

(56) References Cited

U.S. PATENT DOCUMENTS

| 5,581,684 A | * | 12/1996 | Dudzik et al. ............... 715/708 |
| 5,862,321 A | | 1/1999 | Lamming et al. ........ 395/200.3 |
| 6,208,338 B1 | | 3/2001 | Fischer et al. ............... 345/338 |
| 6,289,370 B1 | | 9/2001 | Panarello et al. ............ 709/200 |
| 6,505,243 B1 | * | 1/2003 | Lortz ........................ 709/220 |
| 6,888,927 B1 | * | 5/2005 | Cruickshank et al. .... 379/88.11 |
| 2003/0048288 A1 | * | 3/2003 | Drif et al. .................... 345/705 |
| 2004/0044635 A1 | * | 3/2004 | Gordon et al. ................ 706/50 |
| 2004/0201867 A1 | * | 10/2004 | Katano ...................... 358/1.15 |

* cited by examiner

*Primary Examiner*—Sy Luu
*Assistant Examiner*—Anil N Kumar
(74) *Attorney, Agent, or Firm*—John R. Biggers; Jill Poimboeuf; Biggers & Ohanian LLP.

(57) ABSTRACT

Methods, systems, and products for displaying a help resource associated with a device on a remote display apparatus are provided. Some embodiments of methods, systems, and products for displaying a help resource associated with a device on a display apparatus include receiving, in a device, a help event created by a user engaging a help button installed on the device. In response to receiving the help event, typical embodiments include retrieving a help resource associated with the device, and creating, in the device, a help message including the help resource. The help resource can be retrieved from data storage on the device, downloaded from a network location, or any other way of retrieving the help resource that will occur those of skill in the art. The help message is typically broadcast to a display apparatus for display to a user.

3 Claims, 11 Drawing Sheets

DISPLAYING HELP RESOURCES

CROSS-REFERENCE TO RELATED APPLICATION

The present application is related to co-pending application:
U.S. patent application Ser. No. 10/755,837.

BACKGROUND OF THE INVENTION

1. Field of the Invention

The field of the invention is data processing, or, more specifically, methods, systems, and products for displaying a help resource associated with a device on a display apparatus.

2. Description of Related Art

Sophisticated devices have become increasingly commonplace and are reaching a broader range of users. Many users need help operating and configuring these devices. While these devices may have sufficient memory and communication ability to store and transmit help resources associated with the device, these devices often do not have sufficient display capabilities to display the help resources. Furthermore, it is not always desirable or economical to include a presentation interface on such devices so that they can display the help resource. Currently, hard copy help resources such as manuals are provided with such devices. These hardcopy help resources are often lost or destroyed. It would be advantageous therefore to provide a method, system, and computer program product for displaying a help resource associated with a device that does not require the device to have sufficient display capabilities to display the help resource.

SUMMARY OF THE INVENTION

Methods, systems, and products for displaying a help resource associated with a device on a remote display apparatus are provided. Typically, but not necessarily, the device has insufficient display capabilities to display the help resource associated with the device. That is, the device may have some display capabilities, but the device does not support displaying its own help resource. Display apparatuses that do have sufficient display capabilities to display the help resource are therefore used to display the help resource associated with the device. The display apparatus is said to be remote because the display apparatus is distinct and physically separate from the device.

Some embodiments of methods, systems, and products for displaying a help resource associated with a device on a remote display apparatus include receiving, in a device, a help event created by a user engaging a help button installed on the device. In response to receiving the help event, typical embodiments include retrieving a help resource associated with the device, and creating, in the device, a help message including the help resource. The help resource can be retrieved from data storage on the device, downloaded from a network location, or any other way of retrieving the help resource that will occur those of skill in the art. The help message is typically broadcast to a remote display apparatus for display to a user.

In some alternative embodiments, the help resource is not stored on the device or downloaded to the device. Such embodiments often include receiving, in a device, a help event created by a user engaging a help button installed on the device and broadcast from the device to the display apparatus. In response to receiving the help event, typical embodiments include creating a help message and transmitting the help message to a display apparatus. The display apparatus typically receives the help message, retrieves a help resource associated with the device, and displays the help resource to the user.

Other embodiments are implemented using an architecture that includes a services gateway. Displaying a help resource associated with a device on a display apparatus in accordance with these embodiments often includes receiving, in a device, a help event created by a user engaging a help button installed on the device. In response to receiving the help event, typical embodiments include creating, a help message and transmitting the help message to a services gateway. The services gateway typically receives the help message, retrieves a help resource associated with the device, and selects a display apparatus to display the help resource. The services gateway then sends the help resource to the display apparatus for display.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for displaying a help resource associated with a device on a display apparatus. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Exemplary Architecture

Figure 1:
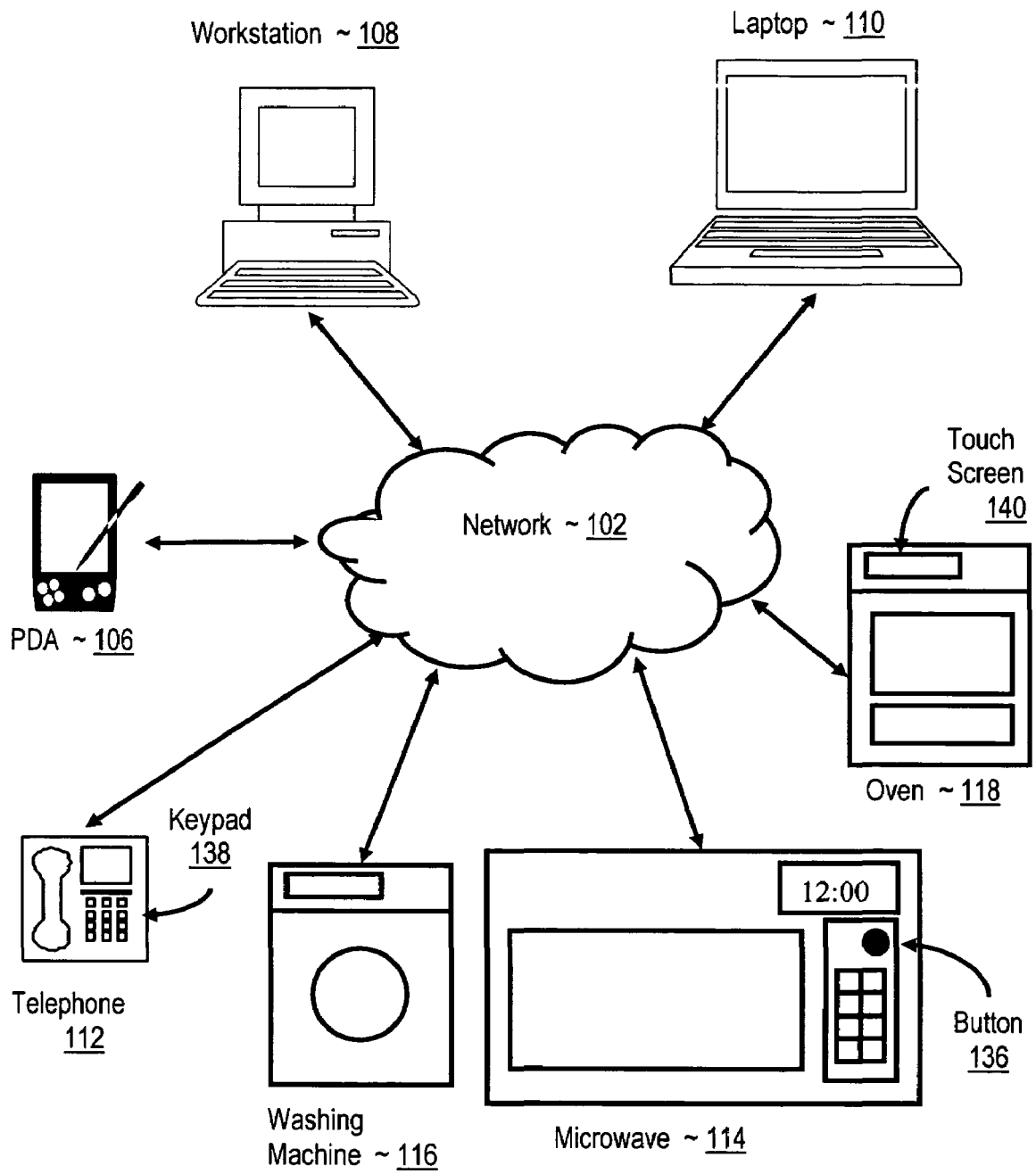
FIG. 1 is a system diagram illustrating relations among components of an exemplary system for displaying a help resource associated with a device on a display apparatus.

Methods, systems, and computer program products for displaying a help resource associated with a device on a display apparatus are explained with reference to the accompanying drawings beginning with FIG. 1. FIG. 1 sets forth a system diagram illustrating relations among components of an exemplary system for displaying a help resource associated with a device on a remote display apparatus. In this specification a device is any networked device. Typically, but not necessarily, the devices described in this specification have insufficient display capabilities to display their associated help resources. That is, these devices may have some display capabilities, but the devices do not support displaying their own help resources. Display apparatuses that do have sufficient display capabilities to display the help resources are therefore used to display the associated help resources. The display apparatuses are said to be 'remote' because the display apparatuses are a separate and physically distinct appliances from the device. The device is typically coupled for wireless data communications with the remote display apparatuses.

"Resource" means any aggregation of information. Network communications protocols generally transmit resources, not just files. The most common kind of resource is a file, but resources can also include dynamically-generated query results, the output of CGI scripts, dynamic server pages, documents available in several languages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources are currently either files or server-side script output. Server side script output includes output from CGI programs, Java servlets, Active Server Pages, Java Server Pages, and so on.

A "help resource" is a resource that provides information about the device. Examples of help resources include text help manuals, instructional videos or video clips, instructional audio files, interactive documents helping a user use the device, or any other resource providing information about the device that will occur to those of skill in the art. Because a help resource means any aggregation of information about the device, "displaying" the help resource means making the resource available to the user. In the case of text or images displaying the resource means making the text or image available for viewing by a user. In the case of audio files, for example, displaying the resource means playing the audio file, thereby making the audio file available to the user.

The system of FIG. 1 operates to display a help resource associated with a device on a remote display apparatus by receiving, in a device, a help event created by a user engaging a help button installed on the device. Examples of devices in the system of FIG. 1 include a telephone (112), a washing machine (116), a microwave (114), an oven (118) or any other device that will occur to those of skill in the art. The exemplary devices (112, 116, 114, and 118) of FIG. 1 include help buttons. A help button is any user input mechanisms capable of creating a help event in response to a user engaging the help button. Examples of help buttons installed on the devices of FIG. 1 include a button (136), a keypad (138), a touch screen (140), a mouse (not shown), or any other user input mechanism that will occur to those of skill in the art.

An "event" means an action or occurrence detected by a program. Events can be user actions, such as clicking a mouse button or pressing a key, or system occurrences, such as running out of memory. A "help event" is an event created by a user engaging a help button. Engaging the help button creates a help event that is received by a help button application installed in the device and that activates the help button application programming to carry out methods of displaying a help resource.

The system of FIG. 1 also operates to display a help resource associated with a device on a remote display apparatus by retrieving, in dependence upon the help event, a help resource associated with the device, creating help message including the help resource, and transmitting the help message to a display apparatus for display. Examples of remote apparatuses capable of functioning as a remote display apparatuses in the exemplary system of FIG. 1 include a PDA (106), a workstation (108), a laptop computer (110), or any other display apparatus that will occur to those of skill in the art. The help message is often broadcast wirelessly from the device to the display apparatus through a network (102) using any protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

The system of FIG. 1 also can operate to display a help resource associated with a device on a remote display apparatus by receiving, in the display apparatus, a help message, and retrieving the help resource from the help message. The retrieved help resource is displayed with the remote display apparatus. Typical display apparatuses in accordance with FIG. 1 are also capable of receiving a plurality of help messages from a plurality of display apparatuses, prioritizing one the help messages, and displaying the help resource associated with the prioritized help message.

Figure 2:
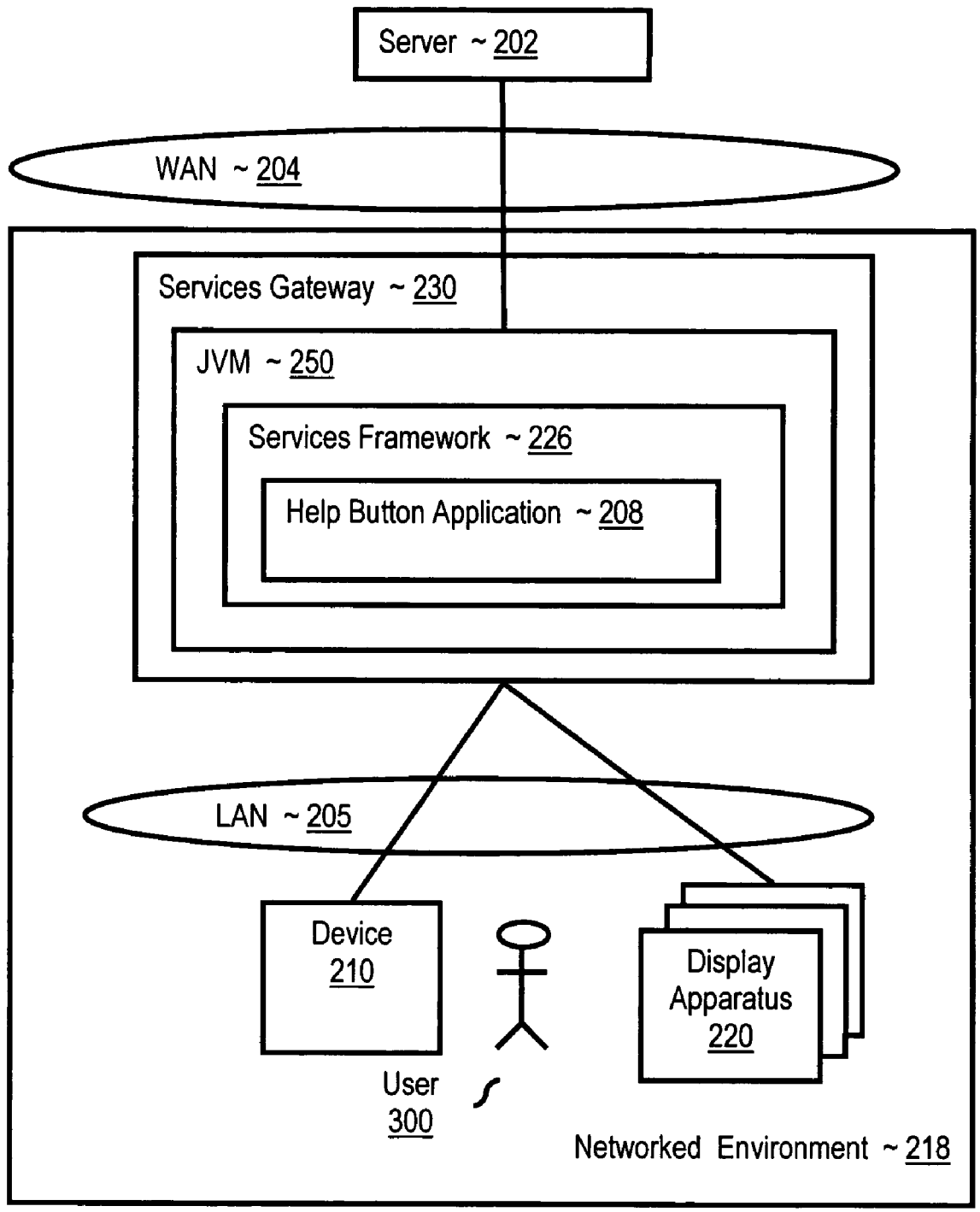
FIG. 2 is another system diagram illustrating an alternative architecture capable of displaying a help resource associated with a device on a display apparatus.

FIG. 2 is another system diagram illustrating an alternative architecture capable of displaying a help resource associated with a device on a display apparatus. The architecture of FIG. 2 includes a locally networked environment (218). Examples of various locally networked environments include home networks, car networks, office network, and others as will occur to those of skill in the art.

The architecture of FIG. 2 includes a services gateway (230) coupled for data communications through a local area network (205) to a device (210) and a plurality of display apparatuses (220). While the system of FIG. 2 illustrates only three display apparatuses, any number of display apparatuses having varied display capabilities can be coupled for data communications with the services gateway (230). A services gateway (230) is, in some exemplary architectures, an OSGi compatible services gateway (230). While exemplary embodiments of methods for displaying a help resource are described in this specification using OSGi, many other applications and frameworks will also work to implement methods of displaying a help resource. Commercial implementations of OSGi, such as JES and SMF, are also useful in implementing methods for displaying a help resource.

In the exemplary architecture of FIG. 2, the services gateway (230) includes a services framework (226). The services framework (226) of FIG. 2 is a hosting platform for running 'services.' Services are the main building blocks for creating applications in the OSGi. An OSGi services framework (226) is written in Java and therefore, typically runs on a Java Virtual Machine (JVM) (250).

The exemplary architecture of FIG. 2 includes a help button application (208). The help button application (208) is application software implementing methods for displaying a help resource associated with a device (210) on a display apparatus (220). In some embodiments, the help application is OSGi compliant application software, and is therefore implemented as a service or a group of services packaged as a bundle installed on the services framework (226). In this specification, help applications are often discussed in the context of OSGi. However, the discussion of OSGI is for explanation and not for limitation. In fact, help applications can be implemented in any programming language, C, C++, COBOL, FORTRAN, BASIC, and so on, as will occur to those of skill in the art, and help applications developed in languages other than Java are installed directly upon an operating system or operating environment rather than a JVM.

The system of FIG. 2 operates to display a help resource associated with a device on a display apparatus by receiving, in a device, a help event created by a user engaging a help button installed on the device. Engaging the help button creates a help event that is received by a help button application installed in the device and that activates the help button application programming to create a help message and transmit the help message to the help button application (208) running on the services framework (226).

The help button application (208) receives the help message and retrieves, in dependence upon the help message, a help resource associated with the device. In typical embodiments, the help resource is either retrieved from data storage on the services framework (226) or is downloaded from the network location of a server (202). Some embodiments of the help button application are also capable of receiving a plurality of help messages from a plurality of display apparatuses, and prioritizing one the help messages, and retrieving a help resource associated with the prioritized help message. The help button application is capable of selecting one of a plurality of display apparatuses (220) to display the help resource and sending the help resource to the selected display apparatus (220) for display to the user (300). The help resource is sent to the selected display apparatus using any data communications protocol such as HTTP, WAP, Bluetooth, 802.11, LonWorks, X-10, or any other data communications protocol that will occur to those of skill in the art.

Figure 3:
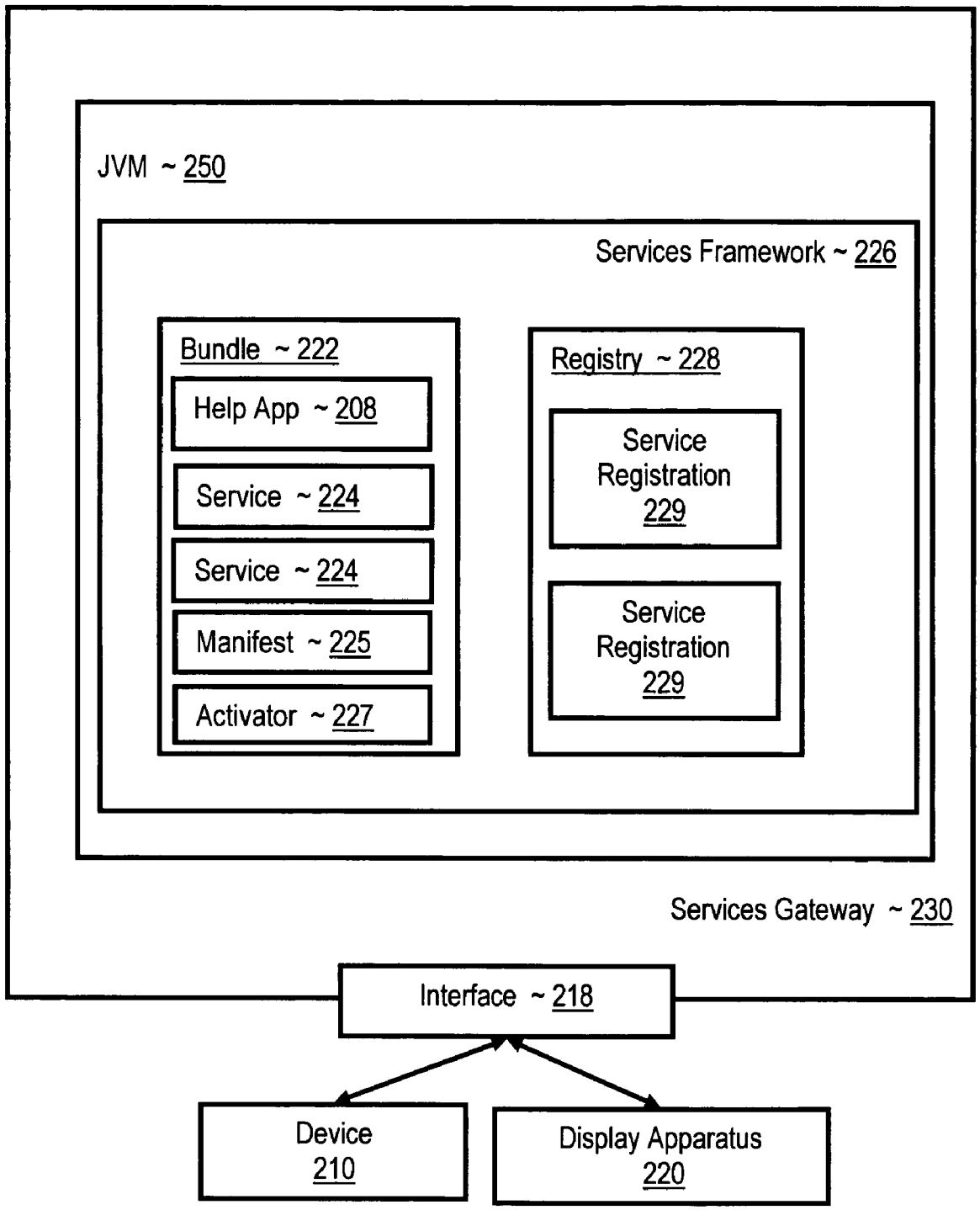
FIG. 3 is a block diagram of an exemplary services gateway useful in implementing methods of displaying a help resource.

In this specification, help button applications are often discussed in the context of OSGi. To provide further explanation of OSGi, FIG. 3 is a block diagram of an exemplary services gateway (230) useful in implementing methods of displaying a help resource. The exemplary services gateway (230) of FIG. 3 is an OSGi compatible services gateway (230). OSGi Stands for 'Open Services Gateway Initiative.' The OSGi specification is a Java-based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 2394, Universal Serial Bus (USB), WAP, X-10, Lon Works, HomePlug and various other networking technologies. The OSGi specification is available for free download from the OSGi website at www.osgi.org. The services gateway (230) of FIG. 3 includes an OSGi service framework (226). An OSGi service framework (226) is written in Java and therefore, typically runs on a Java Virtual Machine (JVM).

The OSGi services framework (226) of FIG. 3 is a hosting platform for running 'services' (224). Services (224) are the main building blocks for creating applications according to the OSGi. A service (224) is a group of Java classes and interfaces. The OSGi specification provides a number of standard services. For example, OSGi provides a standard HTTP service that can respond to requests from HTTP clients. OSGi also provides a set of standard services called the Device Access Specification. The Device Access Specification ("DAS") provides services to identify a device connected to the services gateway, search for a driver for that device, and install the driver for the device.

Services (224) in OSGi are packaged in 'bundles' (222) with other files, images, and resources that the services (224) need for execution. A bundle (222) is a Java archive or 'JAR' file including one or more service implementations (224), an activator class (227), and a manifest file (225). An activator class (227) is a Java class that the service framework (226) uses to start and stop a bundle. A manifest file (225) is a standard text file that describes the contents of the bundle (222).

Installed on the services framework (226) of FIG. 3 is a help button application (208). The exemplary help button application typically receives a help message from a device, retrieves a help resource associated with that device, selects a display apparatus to display the help resource, and sends the help resource to the display apparatus. Some embodiments of the help button application are also capable of receiving a plurality of help messages from a plurality of devices, prioritizing one the help messages, and retrieving a help resource associated with the prioritized help message. The help button application is packaged within a bundle (222) and installed on the services framework (226).

The services framework (226) also includes a service registry (228). The service registry (228) includes a service registration (229) including the service's name and an instance of a class that implements the service for each bundle (222) installed on the framework (226) and registered with the service registry (228). A bundle (222) may request services that are not included in the bundle (222), but are registered on the framework service registry (228). To find a service, a bundle (222) performs a query on the framework's service registry (228).

Figure 4:
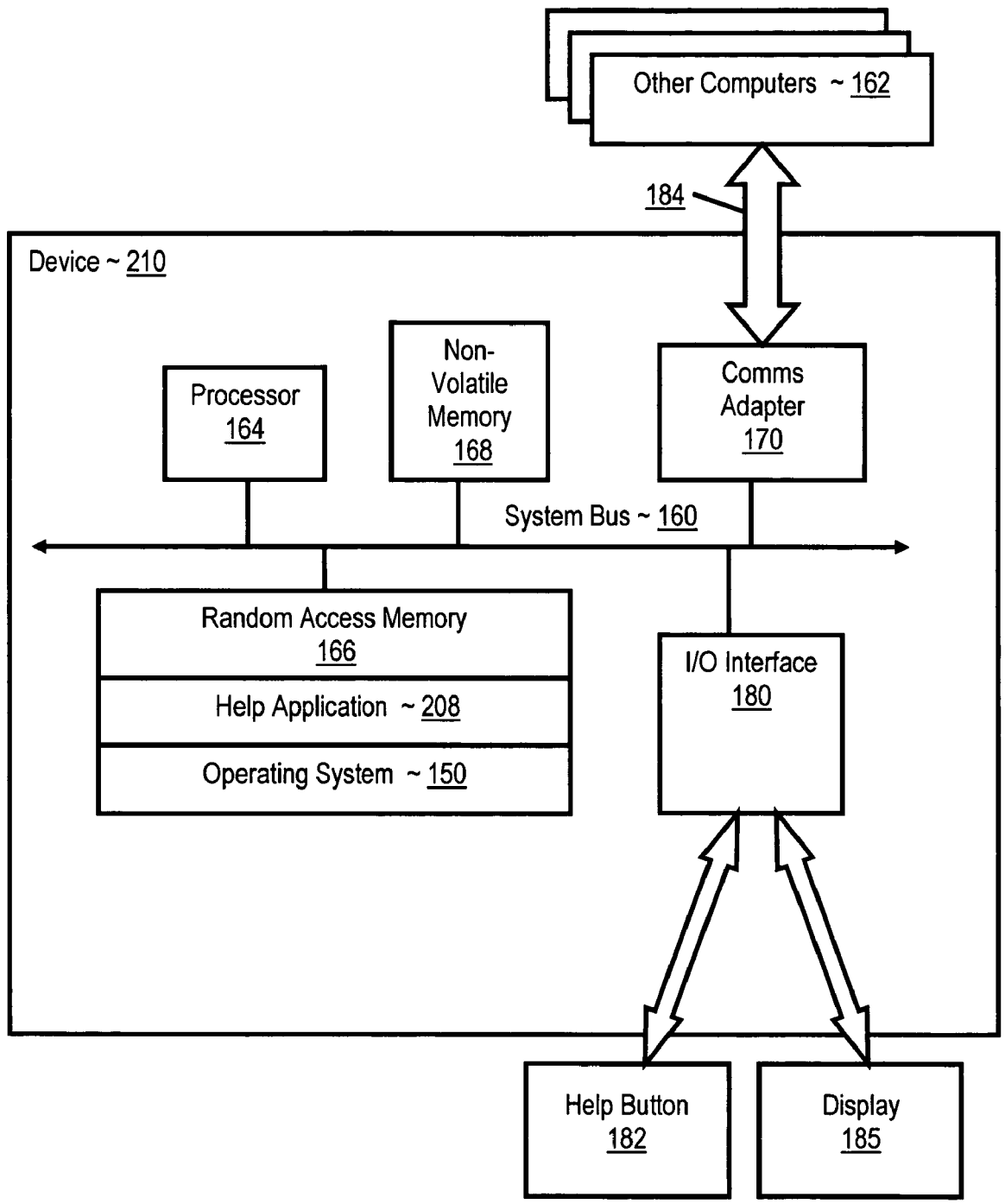
FIG. 4 sets forth a block diagram of an exemplary device showing relations among various components.

Devices typically comprise automated computing machinery capable of receiving, in a device, a help event created by a user engaging a help button installed on the device. Devices are also typically capable of creating, in the device, a help message and transmitting the help message either to a services gateway in accordance with the architecture of FIG. 2 or directly to the display apparatus in accordance with the architecture of FIG. 1. FIG. 4 sets forth a block diagram of an exemplary device (210) showing relations among various components. In FIG. 4, the device (210) includes a processor (164), also typically referred to as a central processing unit or 'CPU.' The processor may be a microprocessor, a programmable control unit, or any other form of processor useful according to the form factor of a particular device as will occur to those of skill in the art. Other components of the device (210) are coupled for data transfer to processor (164) through system bus (160).

The exemplary device of FIG. 4 also includes random access memory or 'RAM' (166). Stored in RAM (166) a help application program (208) that implements aspects of methods for displaying help resources associated with the device. In addition, software programs and further information for use in implementing methods of displaying a help resource according to various embodiments may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

The device (210) of FIG. 4 includes a communications adapter (170) implementing data communications connections (184) to other computers (162), including particular display apparatuses in accordance with the architecture of FIG. 1 and services gateways in accordance with the architecture of FIG. 2. Communications adapters implement the hardware level of data communications connections through which devices communicate with services gateways or display apparatuses through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The exemplary device of (210) of FIG. 4 also includes one or more input/output interface adapters (180). Input/output interface adapters in computers implement user-oriented input/output through, for example, software drivers and computer hardware for controlling output to the device's display (185) such as computer display screens. Although the device of FIG. 4 is illustrated with a display (185), in typical embodiments the devices display capabilities are not sufficient to the display a help resource for the device, and therefore a help resource is transmitted to a display apparatus, either directly or through a services gateway, for display to the user. Input/output interface adapters also implement user-oriented input/output through, for example, software drivers and computer hardware for controlling user input from a help button (182) such as a keypad, joystick, mouse, keyboard, and touch screen or any other user input mechanism.

Figure 5:
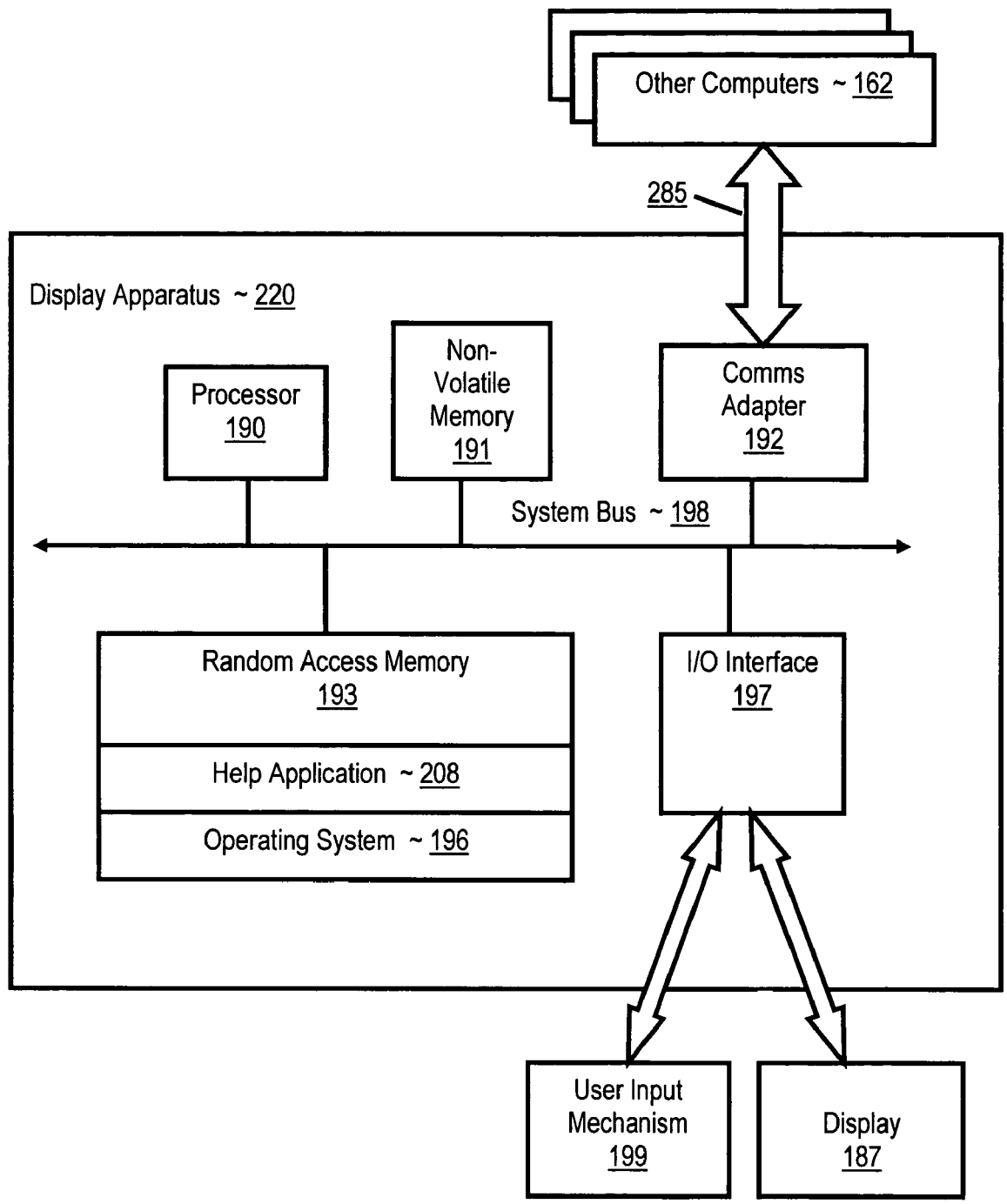
FIG. 5 sets forth a block diagram of an exemplary display apparatus showing relations among various components.

Display apparatuses capable of receiving a help resource from a remote device and displaying the help resource to the user also typically comprise automated computing machinery. FIG. 5 sets forth a block diagram of an exemplary display apparatus (220) showing relations among various components. In FIG. 5, the display apparatus (220) includes a processor (190), also typically referred to as a central processing unit or 'CPU.' The processor may be a microprocessor, a programmable control unit, or any other form of processor useful according to the form factor of a particular display apparatus as will occur to those of skill in the art. Other components of the display apparatus (220) are coupled for data transfer to processor (190) through system bus (198).

The exemplary display apparatus (220) of FIG. 5 also includes random access memory or 'RAM' (193). Stored in RAM (193) is a help application program (208) that implements aspects of methods for displaying help resources associated with the device. In addition, software programs and further information for use in implementing methods of displaying a help resource, such as web browsers or other applications facilitating display of a resource, may be stored in RAM or in non-volatile memory (191). Non-volatile memory (191) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

The display apparatus (220) of FIG. 5 includes a communications adapter (192) implementing data communications connections (285) to other computers (162), including devices in accordance with the architecture of FIG. 1 and services gateways in accordance with the architecture of FIG. 2. Communications adapters implement the hardware level of data communications connections through which display apparatuses communicate with services gateways or devices through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The exemplary display apparatus of FIG. 5 also includes one or more input/output interface adapters (197). Input/output interface adapters in computers implement user-oriented input/output through, for example, software drivers and computer hardware for controlling output to the display (187) such as computer display screens, speakers to display the help resource, as well as user input from user input mechanisms (199) such as keypads, joysticks, mice, keyboards, and touch screens, all of which are capable of receiving navigation events from a user to navigate a help resource.

Exemplary Classes and Class Cooperation

Figure 6:
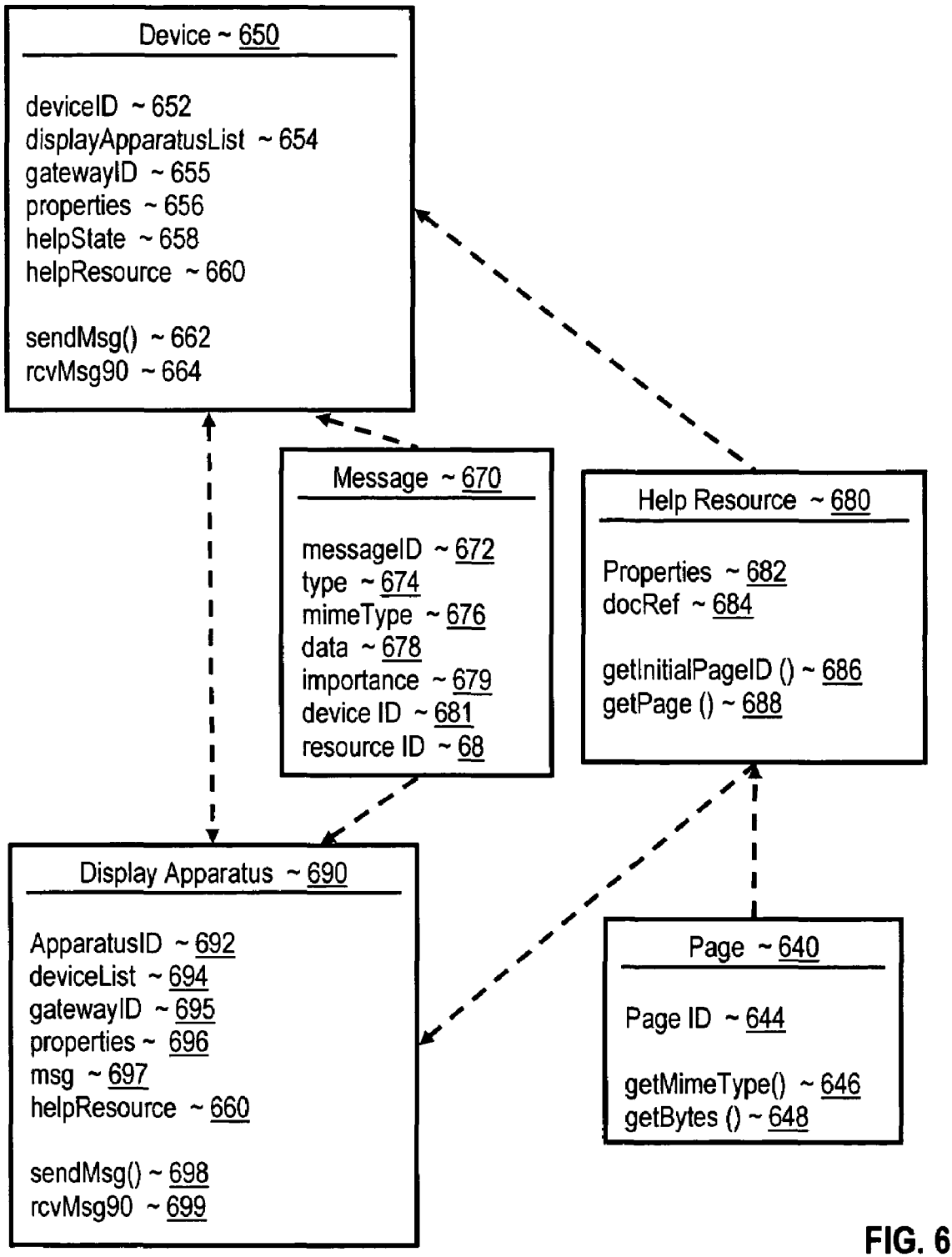
FIG. 6 is a block diagram illustrating exemplary classes useful in implementing methods of displaying a help resource associated with a device on a display apparatus and an exemplary relationship between those classes.

FIG. 6 is a block diagram illustrating exemplary classes useful in implementing methods of displaying a help resource associated with a device on a display apparatus and an exemplary relationship between those classes. A "class" is a complex data structure that typically includes member methods, functions, or software routines as well as data elements. Instances of classes are referred to as "objects" or "class objects." A "method" or "member method" is a process performed by an object. The exemplary classes of FIG. 6 are presented as an aid to understanding, not for limitation. While methods of displaying help resources associated with a device are discussed generally in this specification in terms of Java, Java is used only for explanation, not for limitation. In fact, methods of displaying help resources associated with a device can be implemented in many programming languages including C++, Smalltalk, C, Pascal, Basic, COBOL, Fortran, and so on, as will occur to those of skill in the art.

The class diagram of FIG. 6 includes an exemplary device class (650) representing the device having an associated help resource. The exemplary device class (650) includes a device ID (652) identifying the device. Exemplary device IDs include a serial number, device make and model, or any other identification identifying the device that will occur to those of skill in the art.

The device class (650) of FIG. 6 includes a displayApparatusList (654) that includes a list of available display apparatuses capable of displaying a help resource associated with the device. Typically, the displayApparatusList (654) is useful in implementing methods of displaying a help resource in accordance with the architecture of FIG. 1. In such methods, the device typically broadcasts a help resource directly to one or more display apparatuses identified in the displayApparatusList (654) for display. The displayApparatusList (654) can be implemented as a Java list container, a hashtable, or any other data structure that will occur to those of skill in the art.

The device class (650) of FIG. 6 includes a gateway ID (655) identifying a services gateway coupled for data communications with the device. Such a services gateway is useful in implementing methods for displaying a help resource in accordance with the architecture of FIG. 2 that includes a services gateway coupled for data communications with a device and a plurality of display apparatuses.

The device class (650) of FIG. 6 includes a properties field (656) that includes properties of the device. One example of properties of a device is an identifier identifying whether the device is capable of interactive help. That is, whether the input mechanisms of the device are capable of operating both in their normal mode, as well as in interactive help mode. In interactive help mode, the device input mechanism are used both to control the device in normal operation as well as to infer an appropriate help resource. Interactive help mode is discussed below.

The device class (650) includes a helpState field (658). The helpState field includes an indication of the current help state of the device. Exemplary help states are on, off, or interactive. When the help state is "off" the help button application is typically inactive and help resources associated with the device are not identified or displayed for the user. If the help state is "on," the help button application is typically active and available to retrieve help resources associated with the device and transmit those help resources to a display apparatus for display. If the helpState is "interactive," the help button application is active to retrieve help resources, but the normal operations of the device are also active. In interactive help state, normal operational events are received when the user uses the device and those operational events are used to retrieve an appropriate help resource for display as discussed below.

The device class (650) of FIG. 6 includes a help resource (680). In such embodiments, the help resource is stored on the device. In some alternate embodiments, where the help resource is not stored on the device, the device class includes a network location of the help resource facilitating downloading the help resource as needed to implement methods of displaying the help resource. The device class (650) of FIG. 6 include member methods sendMsg( ) (662) and rcvMsg ( ) (664) used to send and receive a message to a display apparatus in accordance with the architecture of FIG. 1 or a services gateway in accordance with the architecture of FIG. 2.

The class diagram of FIG. 6 includes an exemplary display apparatus class (690) representing a display apparatus capable of displaying the help resource associated with the device. The display apparatus class (690) of FIG. 6 includes an apparatus ID (692). The apparatusID can be a serial number, make and model of the display apparatus or any other identification of the display apparatus that will occur to those of skill in the art.

The display apparatus class (690) of FIG. 6 includes a deviceList (694) identifying devices for which help messages or help resources are received, and whose help resources the display apparatus is capable of displaying. In some embodiments, using the architecture of FIG. 1, the deviceList includes devices that directly broadcast a help message including a help resource to the remote display apparatus. The deviceList (694) can be implemented as a Java list container, a hashtable, or any other data structure that will occur to those of skill in the art.

The exemplary display apparatus class (690) includes a gatewayID (695). The gateway ID includes an identification of a services gateway coupled for data communications to the display apparatus in embodiments implementing the architecture of FIG. 2. The exemplary display apparatus class (690) also includes a properties field (696) identifying the properties of the display apparatus, such as, display capabilities of the display apparatus.

The exemplary display apparatus class (690) of FIG. 6 includes msg (697) field containing a reference to a current help message transmitted to the display apparatus either directly from the device or from a services gateway. The exemplary display apparatus class (690) also includes a helpResource (660) field for data storage for the help resource associated with the device on the display apparatus. The exemplary display apparatus class (690) includes sendMsg( ) (698) and rcvMsg (699) member methods for sending and receiving a messages, such as for example, help messages, control messages, or any other message that will occur to those of skill in the art.

The class diagram of FIG. 6 includes an exemplary message class (670) representing a help message. The exemplary message class (670) is provided for clarity of explanation. In various embodiments, the actual message structure implemented will vary according to the protocol used to send the message. The exemplary message class (670) includes a messageID (672) identifying the message. The exemplary message class (670) includes a type field (674) identifying the message type such as control, reference, acknowledge or any other type of message that will occur to those of skill in the art. The specific message types available vary according to protocol used to transmit the message. The exemplary message class (670) also includes a mimeType (676) field identifying the MIME type associated with the content of the message and the data (678) transmitted with the message.

The message class (670) of FIG. 6 includes an importance (679) field. In the case of help messages, the importance field includes values that identify an importance of the help message. The importance rating of the help message is used, in some embodiments, to prioritize one or more help messages. The message class (670) of FIG. 6 includes a device ID field (681). In the case of help messages, the device ID identifies the device that created the help message. The exemplary message class of FIG. 6 also includes a resource ID field. In the case of some help messages, a resource ID field includes an identification of a resource. This resource ID can be used by either a display apparatus or services gateway to retrieve a help resource associated with the help message.

The class diagram of FIG. 6 includes a help resource class (680) representing a help resource. As discussed above a help resource is any aggregation of information about the device including but not limited to text files, audio files, video files and so on. While the exemplary help resource class (680) of FIG. 6 describes a resource embodied as a help document, there is no such limitation and this example is provided for clarity of explanation only. The exemplary resource class (680) of FIG. 6 includes a properties field (682) including a description or identification of the properties of the resource. Often a description or identification of the properties of the help document often reveal the display requirement of resources, such as identifying that a resource is a PDF file, a JPEG file or any other description of the properties of the help resource.

The exemplary help resource class (680) of FIG. 6 includes a docRef field (684) containing a reference to the help resources such as a help resource name or URL identifying the location of the help resource. The help resource (680) of FIG. 6 includes getInitialPageID( ) (686) that returns the initial page of the help resource. The exemplary help resource (680) of FIG. 6 also includes a getPage ( ) (688) member method that returns a page of the help resource.

The exemplary class diagram of FIG. 6 includes an exemplary page class (640) representing an individual page of the help resource. As stated above, there is no requirement that the help resources actually employ pages and the inclusion of the page class is for explanation not limitation. The exemplary page class (640) includes a pageID (644) identifying the page. The page class also includes a geMimeType ( ) member method (646) that returns the MIME type of the page and a getBytes ( ) member method (648) that returns the data of the page.

Turning briefly to an exemplary relationship among the classes of FIG. 6. In the class relationship diagram of FIG. 6, the dotted arrows represent references. The arrow points from a referenced class to a class whose objects possess references to the referenced class. That is, an object-oriented relation of composition, a "has-a-reference " relationship between classes, is shown by an arrow with a dotted line. In the example of FIG. 6, the device class (650) has a reference to the display apparatus class (690) and the display apparatus class (690) has a reference to the device class (650). The device class (650) and the display apparatus class (690) have references to the message class (670) and the help resource class (680). The help resource class (680) has a reference to the page class (640).

Displaying Help Resources

Figure 7:
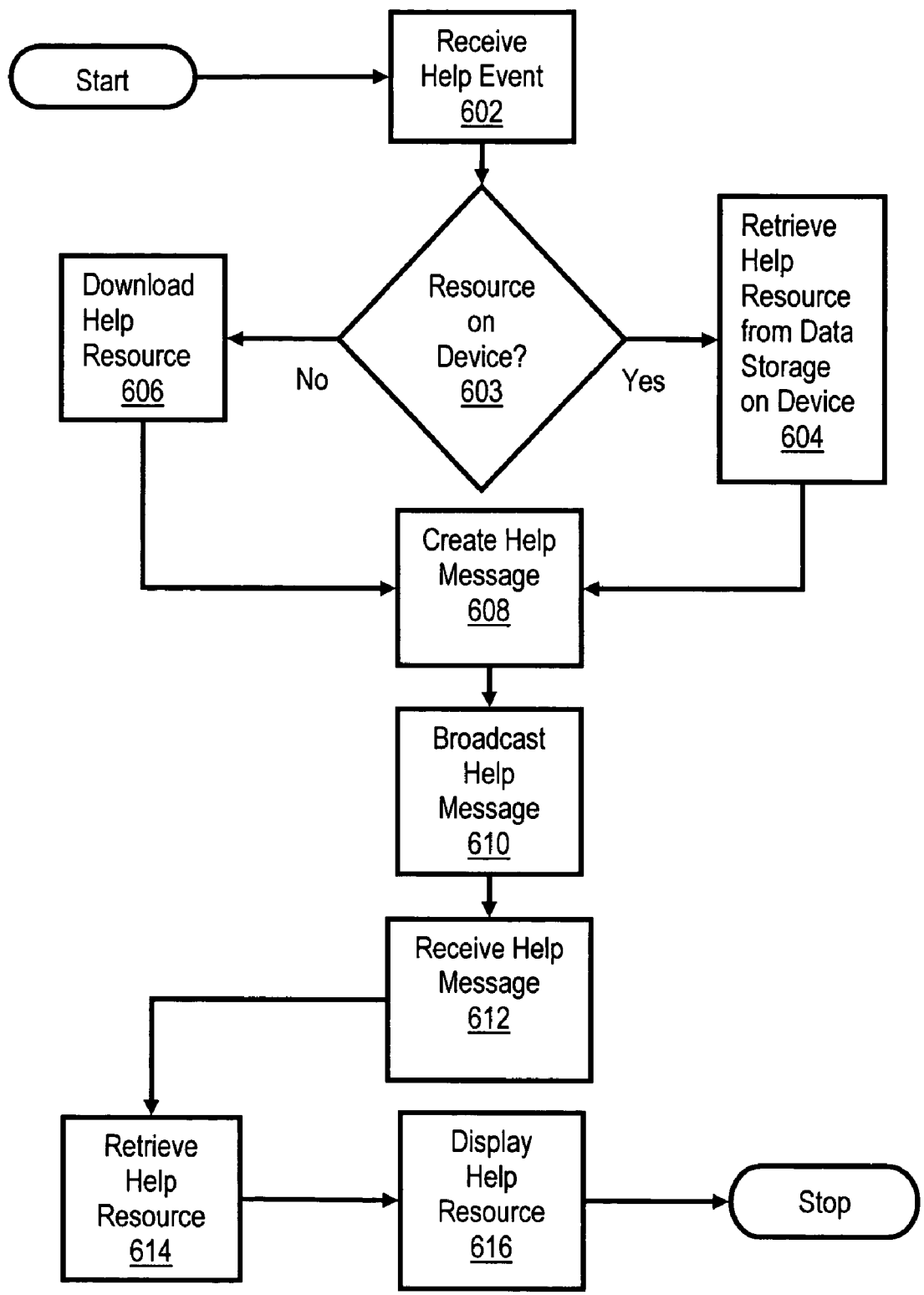
FIG. 7 is a flow chart illustrating an exemplary computer implemented method for displaying a help resource associated with a device on a display apparatus.

FIG. 7 is a flow chart illustrating an exemplary computer implemented method for displaying a help resource associated with a device on a remote display apparatus. The method of FIG. 7 is typically implemented using the architecture of FIG. 1. The method of FIG. 7 includes receiving (602), in a device, a help event created by a user engaging a help button installed on the device. As discussed above, an "event" means an action or occurrence detected by a program. A "help event" is an event that activates help button application programming installed on the device and is typically created by a user engaging a help button installed on the device. As discussed above, any input mechanism can function as a help button. Keypads, mice, touch screens, are examples of input mechanisms that can function as a help button.

The method of FIG. 7 includes determining (603) whether the help resource associated with the device is stored on the device. If the help resource is stored on the device, the method of FIG. 7 includes retrieving (604) the help resource from data storage on the device and creating (608), in the device, a help message including the help resource. In some examples of the method of FIG. 7, more than one help resource is stored on the device. In some such examples, the help resource is retrieved in dependence upon the device capabilities of available display apparatuses and the display requirements of the help resource. To identify which of the plurality of help resources to retrieve, help button application software on the device typically searches a display apparatus list to identify the capabilities of available display apparatuses and retrieves a help resource having display requirements that do not exceed the display capabilities of the display apparatus. For example, if the only available display apparatus supports PDF files but not JPEG images, and both a PDF help resource and JPEG help resource are stored on the device, the help button application programming retrieves the PDF help resource.

If the help resource is not stored on the device, the method of FIG. 7 includes downloading (606) the help resource from a network location and creating (608), in the device, a help message including the help resource. In some examples of the method of FIG. 7, a help resource is downloaded in dependence upon the display capabilities of available display apparatuses and the display requirements of the help resource.

The method of FIG. 7 includes broadcasting (610) the help message to a display apparatus for display. In many embodiments, broadcasting the help message to a remote display apparatus for display includes wirelessly transmitting the help message a remote display apparatus using any protocol such as Bluetooth, 802.11, HTTP, WAP, or any other protocol that will occur to those of skill in the art.

In the method of FIG. 7, the device is already associated with a particular display apparatus. That is, the device is already configured to broadcast the help message to a particular display apparatus. However, other embodiments, transmitting (610) the help message includes associating the device with one or more display apparatuses prior to transmitting the help message. One way of associating with one or more display apparatuses includes using DHCP (Dynamic Host Configuration Protocol) or the like to configure the device such that the help message can be broadcast to one or more display apparatuses.

In some embodiments where the device is associated with more than one display apparatus, the method of FIG. 7 includes selecting a particular associated display apparatus to display the help resource and broadcasting the help message to the selected display apparatus. In some embodiments, selecting the display apparatus includes selecting a display apparatus capable of displaying the help resource. One way of selecting a display apparatus includes sending messages to a plurality of display apparatuses containing the properties of the help resource, receiving response messages from a plurality of responding display apparatuses capable of displaying the help resource, and selecting one of the responding display apparatuses for display of the help resource. Another way of selecting a display apparatus includes receiving from a plurality of display apparatuses a plurality of messages containing properties of associated display apparatuses and selecting one or more display apparatuses capable of displaying the help resource.

In other embodiments of the method of FIG. 7, the help resource is broadcast to a plurality of remote display apparatuses for display. In some such cases, all receiving remote display apparatuses capable of displaying the help resource retrieve the help resource from the help message and display the help resource. Other embodiments include selecting one or more of the receiving remote display apparatuses to display the help resource. In some embodiments, the display apparatus located closest to the device is selected to display the help resource.

The method of FIG. 7 includes receiving (612) the help message, retrieving (614) the help resource from the help message, and displaying (616) the help resource on the display apparatus. As discussed above, the help resource can be text files, audio files, video files or any other aggregation of information concerning the device. Displaying the help resource, therefore means making the resource available to the user. That is, showing the resource, playing the resource, or any other method of displaying the resource that will occur to those of skill in the art.

In some examples of the method of FIG. 7, once the help resource has been transmitted to the display apparatus, a user may wish to navigate the display of the resource by instructing the display apparatus to display another page of the resource, start, stop, or pause a resource or any other method of navigating display of the resource. In many embodiments, the user is empowered to navigate the display of the help resource using input mechanisms installed on the device by receiving, through a user input mechanism installed on the device, a help resource navigation event and transmitting the help resource navigation event to the display apparatus. A help resource navigation event is an event that represents instructions for the display of the help resource. Navigation events are typically created by a user engaging one or more input mechanisms installed on the device. In some embodiments, existing input mechanisms on the device have a secondary use when the help button application is active. For example, existing temperature control functions on an oven can be used, when the help button application of the oven is active, to receive navigation events representing instructions to go to the next or previous page of a help document.

Some exemplary help button applications include an interactive help mode. In such embodiments, when the help button application is in interactive help mode, operational events are used to infer a help resource associated not only with the device but also the users current operation of the device. An operational event is an event, often created by a user, that provides operational instructions to the device. For example, a user depressing a "bake" key on an oven creates an operational event instructing the oven to activate its "bake" function. In interactive help mode, a help button application typically retrieves a particular help resource in dependence upon operational events. Continuing with the example of an oven, typical ovens have various modes of operation such as "bake," "broil," and so on. When the help button application is in interactive mode and a user creates an operational event for bake by depressing a bake key on the oven, the help button application retrieves a help resources associated with the bake functions of an oven. By linking operational events to specific help resources associated with those operational events, the help button application advantageously can be used to walk a user through operation of the device.

Figure 8:
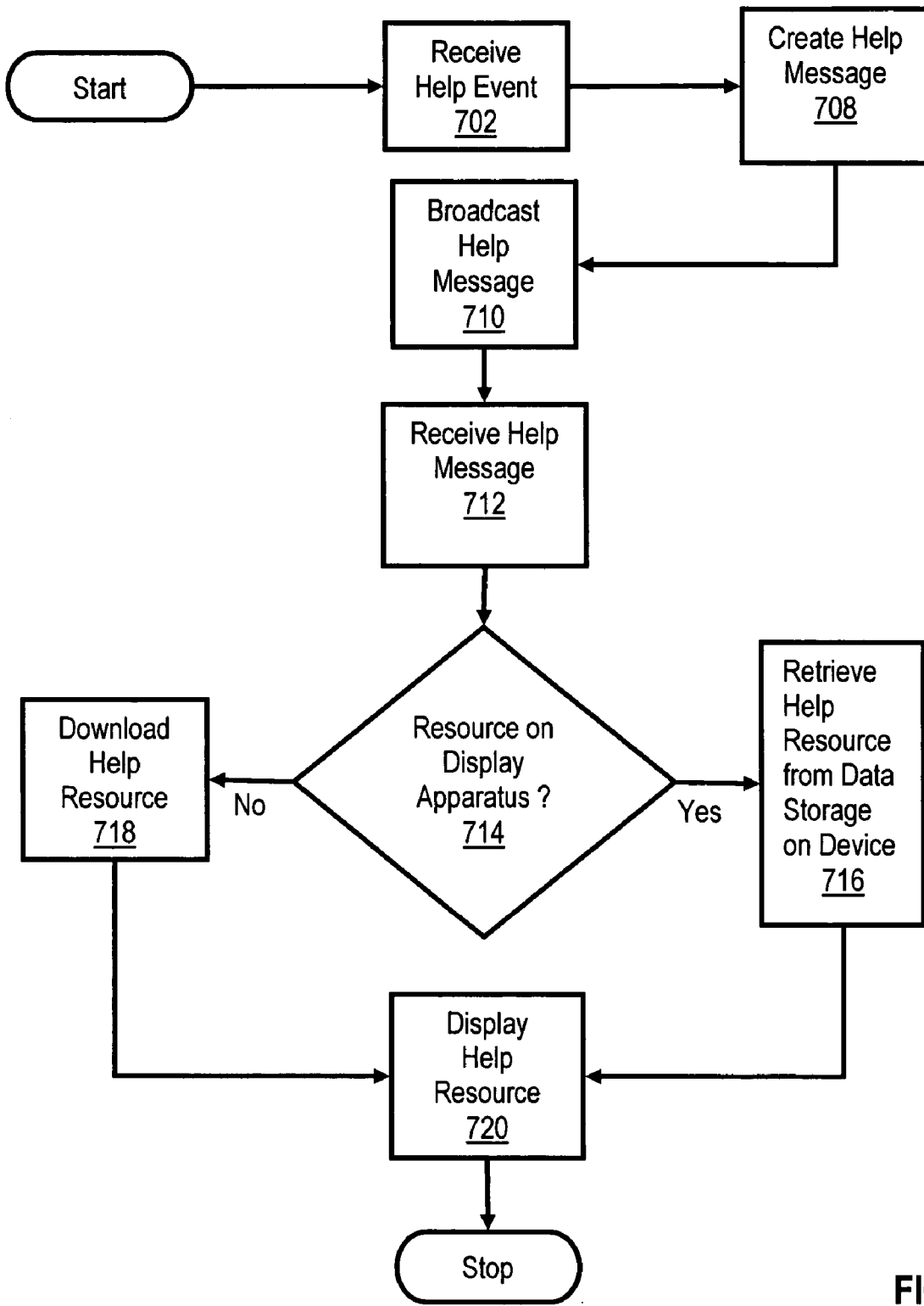
FIG. 8 is a flow chart illustrating another exemplary computer implemented method for displaying a help resource associated with a device on a display apparatus.

In the method of FIG. 7, the help resource is either stored on or downloaded to the device and then broadcast to the display apparatus in a help message for display. In an alternate embodiments, the help resource can instead be stored on or downloaded to the remote display apparatus. FIG. 8 sets forth a flow chart of such an exemplary method for displaying a help resource associated with a device on a remote display apparatus. The method of FIG. 8 includes receiving (702), in a device, a help event created by a user engaging a help button installed on the device and creating (708) a help message. In such embodiments, the help message does not include the help resource. Instead, the help message includes a device ID identifying the device or a resource ID identifying the resource.

The method of FIG. 8 includes broadcasting (710) the help message to a display apparatus. In many examples, the help message is broadcast directly to a display apparatus wirelessly using any protocol such as Bluetooth, 802.11, HTTP, WAP, or any other protocol that will occur to those of skill in the art.

The method of FIG. 8 includes receiving (712), in a display apparatus, a help message created in a device as a result of a user engaging a help button installed on the device and broadcast from the device to the remote display apparatus. The method of FIG. 8 includes determining (714) whether the help resource is stored on the display apparatus.

If the help resource is stored on the display apparatus, the method of FIG. 8 includes retrieving (716) the help resource from data storage on the display apparatus. In the method of FIG. 8 retrieving, in dependence upon the help message, a help resource associated with the device typically includes identifying a device ID contained in the help message and retrieving, from data storage on the display apparatus, a help resource in dependence upon the device ID.

If the help resource is not stored on the display apparatus, the method of FIG. 8 includes downloading (718) the help resource from a network location. In some embodiments, a URL identifying the network location of the help resource is retrieved from the help message and the help resources is downloaded from the network location. Consider the example of a help message containing a URL identifying a HTML help resource. In this example, the display apparatus receives the help message, launches a web browser, retrieves the HTML help resource from the URL included in the help message, and displays the HTML help resource.

The method of FIG. 8 includes displaying (720), with the display apparatus, the help resource. As discussed above, the help resource can be text files, audio files, video files or any other aggregation of information concerning the device. Displaying the help resource, therefore means making the resource available to the user. That is, showing the resource, playing the resource, or any other method of displaying the resource that will occur to those of skill in the art.

As discussed above, methods for displaying a help resource can be implemented with a system employing a services gateway such as the system illustrated in FIG. 2. One exemplary method for displaying a help resource associated with a device on a display apparatus that employs a services gateway is illustrated in the flow chart of FIG. 9. The method of FIG. 9 includes receiving (750), in a device, a help event. As discussed above, a "help event" is an event that activates help button application programming installed on the device and typically created in dependence upon a user engaging a help button installed on the device such as a physical button, mouse, keypad, touch screen, or other input mechanism capable of functioning as a help button.

Figure 9:
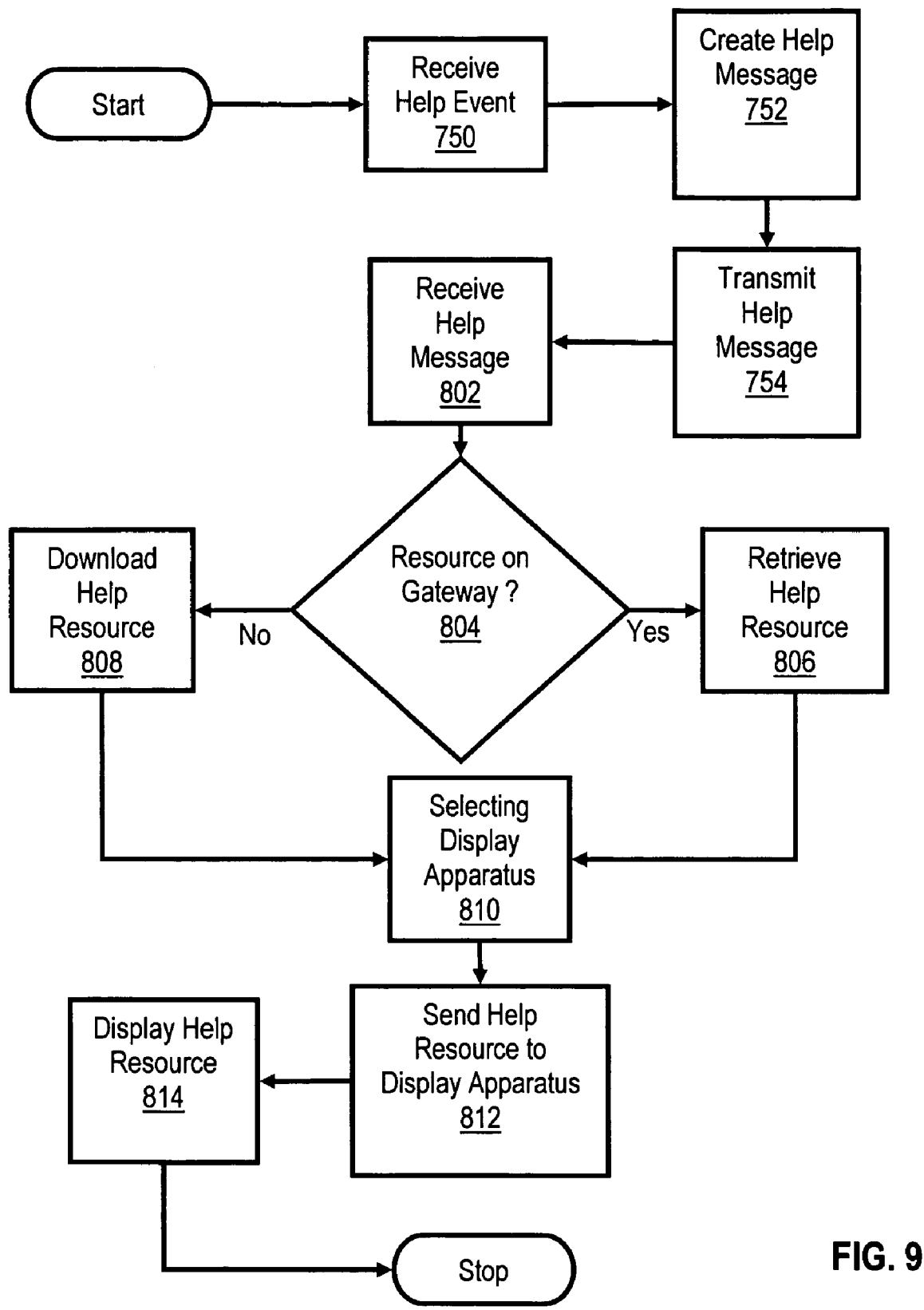
FIG. 9 is a flow chart illustrating another exemplary computer implemented method for displaying a help resource associated with a device on a display apparatus that employs a services gateway.

The method of FIG. 9 includes creating (752) a help message in dependence upon the help event and transmitting (754) the help event to a services gateway. In some examples, a help message includes a device ID identifying the device, or a help resource ID identifying a particular help resource associated with the device. In many examples, the help message is transmitted to the services gateway using any protocol such as Bluetooth, 802.11, HTTP, WAP, or any other protocol that will occur to those of skill in the art.

The method of FIG. 9 includes receiving (802), in a services gateway, the help message from the device and determining (804) whether the help resource is on the services gateway. If the help resource is on the services gateway, the method of FIG. 9 includes retrieving (806) the help resource from data storage on the services gateway. In some embodiments, the help resource is retrieved in dependence upon a device ID or resource ID identifying the help resource.

If the help resource is not on the services gateway, the method of FIG. 9 includes downloading (808) the help resource from a network location. In some embodiments, a URL identifying the network location of the help resource is retrieved from the help message and the help resources is downloaded from the network location.

The method of FIG. 9 includes selecting (810) a display apparatus to display the help resource. In some examples, selecting (810) a display apparatus to display the help resource includes selecting a display apparatus in dependence upon the display capabilities of the display apparatus and the display requirements of the help document. One way of selecting display apparatus therefore includes identifying a MIME type of the help resource and selecting a display apparatus that supports the MIME type of the help resource.

The method of FIG. 9 includes sending (812) the help resource to the display apparatus for display and displaying the help resource (814). As discussed above, the help resource can be text files, audio files, video files or any other aggregation of information concerning the device. Displaying the help resource, therefore means making the resource available to the user. That is, showing the resource, playing the resource, or any other method of displaying the resource that will occur to those of skill in the art.

Displaying Help Resources Associated With Prioritized Help Messages

A single display apparatus can and often will support receiving help messages from a plurality of devices. Help messages created by a plurality of devices are often transmitted to the display apparatus either simultaneously or while the display apparatus is busy displaying a help resource. Display apparatuses capable of administering multiple help messages advantageously prioritize one or more of the received help messages, retrieve a help resource associated with the prioritized help message and display the help resource. In some embodiments, display apparatuses also advantageously notify the devices that transmitted help messages that were not prioritized that the display apparatus is busy.

Figure 10:
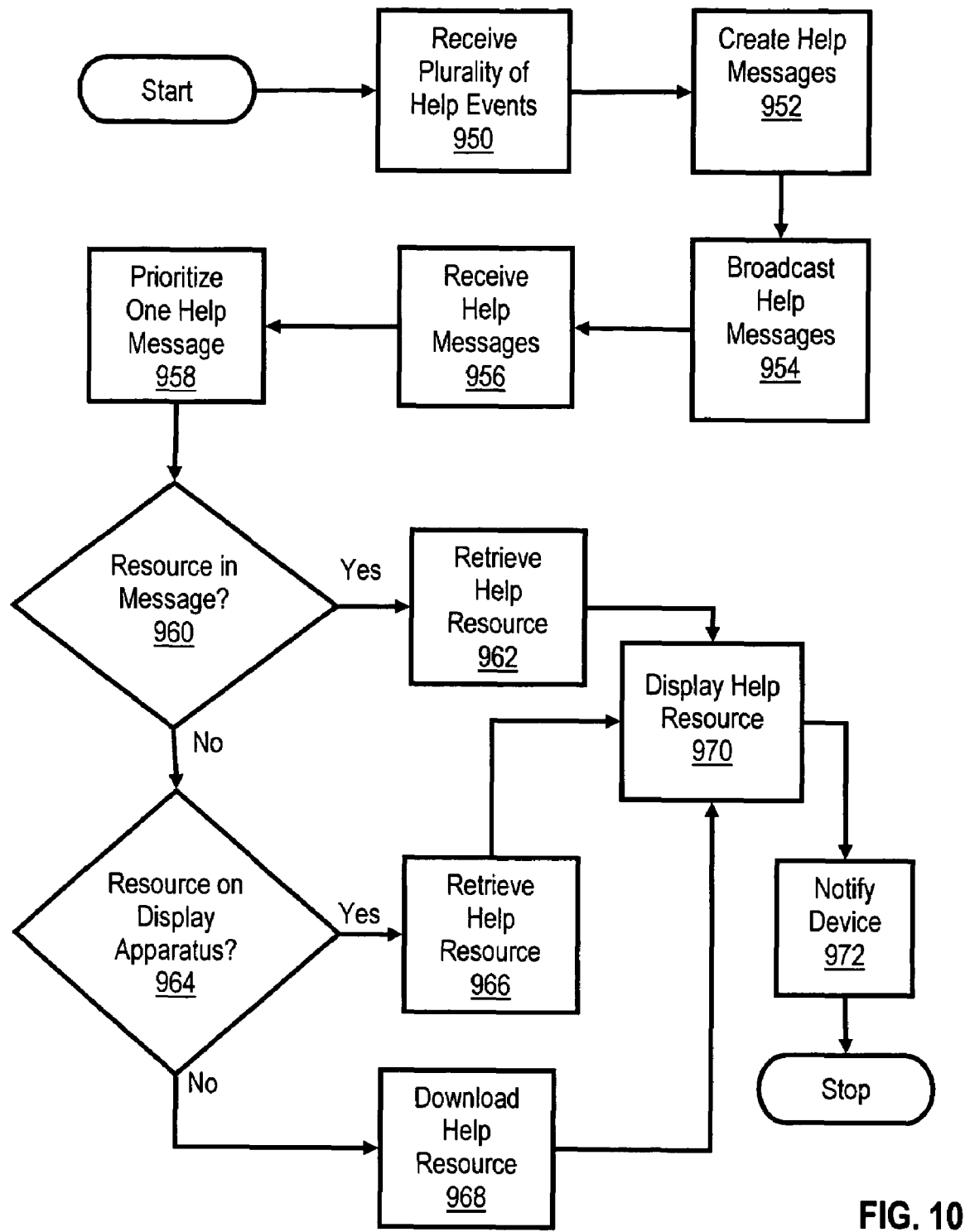
FIG. 10 is a flow chart illustrating an exemplary computer implemented method for displaying a help resource capable of prioritizing one of a plurality of help messages and displaying a help resource associated with the prioritize help message.

FIG. 10 is a flow chart illustrating an exemplary method for displaying a help resource associated with a device on a display apparatus that is capable of accommodating multiple help messages from multiple devices received by a single display apparatus. The method of FIG. 10 is typically implemented using the architecture described above with reference to FIG. 1. The method of FIG. 10 includes receiving (950), in a plurality of devices, help events from a plurality of users. As discussed above, a help event is an event that activates help button application programming installed on a device and is typically created by a user engaging a help button installed on the device. Receiving (950), in a plurality of devices, help events from a plurality of users therefore often includes receiving, in a plurality of devices, help events created as a result of a plurality of user's engaging a plurality of help buttons on the plurality of devices.

The method of FIG. 10 includes creating (952), in the plurality of devices, a plurality of help messages in dependence upon the plurality of help events. In some examples of the method of FIG. 10, creating (952), in a plurality of devices, a plurality of help messages in dependence upon the plurality of help events includes retrieving, from data storage on the each device receiving a help event, a help resource and including the help resource in a help message. If a help resource is not stored on one of the devices receiving help events, creating (952), in a plurality of devices, a plurality of help messages in dependence upon the plurality of help events can include downloading a help resource to the device from a network location.

The method of FIG. 10 includes broadcasting (954) the help messages to the display apparatus. In many examples, the help message is broadcast directly to a display apparatus wirelessly using any protocol such as Bluetooth, 802.11, HTTP, WAP, or any other protocol that will occur to those of skill in the art.

In the method of FIG. 10, the device is already associated with a particular display apparatus. That is, the device is already configured to broadcast the help message to a particular display apparatus. However, in other embodiments, transmitting (954) the help message includes associating the device with one or more display apparatuses prior to transmitting the help message. One way of associating with one or more display apparatuses includes using DHCP (Dynamic Host Configuration Protocol) or the like to configure the device such that the help message can be transmitted to one or more display apparatuses.

In some embodiments where the device associates with more than one display apparatus, the method of FIG. 10 includes selecting a particular associated display apparatus to display the help resource and broadcasting the help message to the selected display apparatus. In some embodiments, selecting the display apparatus includes selecting a display apparatus capable of displaying the help resource. One way of selecting a display apparatus includes sending messages to a plurality of display apparatuses containing the properties of the help resource, and receiving response messages only from a plurality of responding display apparatuses capable of displaying the help resource, and selecting one of the responding display apparatuses for display of the help resource. Another way of selecting a display apparatus includes receiving, from a plurality of display apparatuses, a plurality of messages containing properties of associated display apparatuses and selecting one or more display apparatuses capable of displaying the help resource.

The method of FIG. 10 includes receiving (956), in a display apparatus, the plurality of help messages. Receiving (956), in a display apparatus, the plurality of help messages typically includes creating a queue to store the help messages and adding the plurality of help message to a queue as the help messages are transmitted from the device to the display apparatus. In such embodiments, the help message is transmitted directly to the display apparatus in a manner often described as "point-to-point messaging."

The method of FIG. 10 includes prioritizing (958) one of the plurality of help messages. In some examples of the method of FIG. 10, prioritizing one of the plurality of help messages comprises selecting a help message in dependence upon the position of the message in the queue. In some such embodiments, the help button application installed on the display apparatus retrieves help messages first-in-first-out from the queue. In such embodiments, the prioritized help message is the next help message in the queue.

In another example of the method of FIG. 10, prioritizing (958) one of the plurality of help messages includes selecting a help message from the queue in dependence upon a device ID included in the help message. In such examples, the display apparatus typically retrieves help messages from the queue in dependence upon a predetermined priority of device IDs. That is, some devices are predetermined to have a higher priority than other devices. Such examples typically include comparing the device IDs of the enqueued help messages with a device priority table or other data structure to identify the enqueued help message with the highest priority device ID and retrieving the help message with the highest priority from the queue.

In another example of the method of FIG. 10 prioritizing (958) one of the plurality of help messages comprises selecting a help message in dependence upon an importance rating included in the help message. In such embodiments, the importance rating is included in the help message when the help message is created in the device. In some embodiments, the value of the importance rating is dependent upon the status of the device. For example, a refrigerator whose thermostat is broken may result in an interior temperature that is above a threshold predetermined to endanger the quality of food contained in the refrigerator. A help message created under such conditions may include an importance rating with a higher value than for example a help message created by a refrigerator whose interior light is broken.

In some alternative embodiments, prioritizing (958) one of the plurality of help messages is implemented without a queue. In such embodiments, when a new help message is received from a device, an importance rating of the new help message is compared with an importance rating associated with a currently displayed help resource associated with another device. If the new help message has a higher importance rating, the help resource associated with that new help message is retrieved and displayed without delay. If the help message has a lower importance rating, the display apparatus continues to display the currently displayed help resource and ignores or delays processing of the new help message.

The method of FIG. 10 includes determining (960) whether the resource is in the prioritized message. If the help resource is in the prioritized message, the method of FIG. 10 includes retrieving (962) the help resource from the message and displaying (970), with the display apparatus, the help resource. As discussed above, the help resource can be a text file, audio file, video file or any other aggregation of information concerning the device. Displaying the help resource, therefore means making the resource available to the user. That is, showing the resource, playing the resource, or any other method of displaying the resource that will occur to those of skill in the art.

If the help resource is not included in the help message, the method of FIG. 10 includes determining (964) whether the help resource is stored on the display apparatus. If the help resource is on the display apparatus, the method of FIG. 10 includes retrieving (966) the help resource from data storage on the display apparatus and displaying (970), with the display apparatus, the help resource. In some embodiments, the help resource is retrieved from data storage in dependence upon a device ID or resource ID identifying the help resource included within the help message.

If the help resource is not on the display apparatus, the method of FIG. 10 includes downloading (968) the help resource from a network location and displaying (970), with the display apparatus, the help resource. Downloading (968) the help resource from a network location typically includes retrieving, from the help message a URI identifying the location of the help resource downloading the help resource from the location.

The method of FIG. 10 also advantageously includes notifying (972) at least one of the plurality of devices that transmitted a help message that was not prioritized that the display apparatus is busy. That is, in typical embodiments, while the display apparatus is displaying a help resource associated with a prioritized help message, the display apparatus is busy and therefore, notifies devices whose help messages were not prioritized. Notifying (972) at least one of the plurality of devices that the display apparatus is busy typically includes identifying at least one of the enqueued help messages that is not prioritized, identifying the device associated with that help message, creating a busy message, and transmitting the busy message to at least one of the plurality of devices.

In some examples of the method of FIG. 10, a device receiving a busy message supports some interface capability to alert the user of the busy message. Examples of such alerts include displaying an icon to the user alerting the user that the display apparatus is currently busy, playing an earcon such as a beep or busy signal to alert the user that the display apparatus is currently busy, or any other alert that will occur those of skill in the art.

In some examples of the method of FIG. 10, upon receiving a busy message from a display apparatus, a device is capable of creating a new help message and either transmitting the help message to another display apparatus or transmitting the help message to the same display apparatus. In some embodiments where the device transmits the new help message to the same display apparatus, when the device creates a new help message the device increases a value of the importance rating included in the new help message. Increasing the value of the importance rating of the help message thereby increases the probability that the new message will be prioritized in the display apparatus and that the associated help resource will be displayed.

Figure 11:
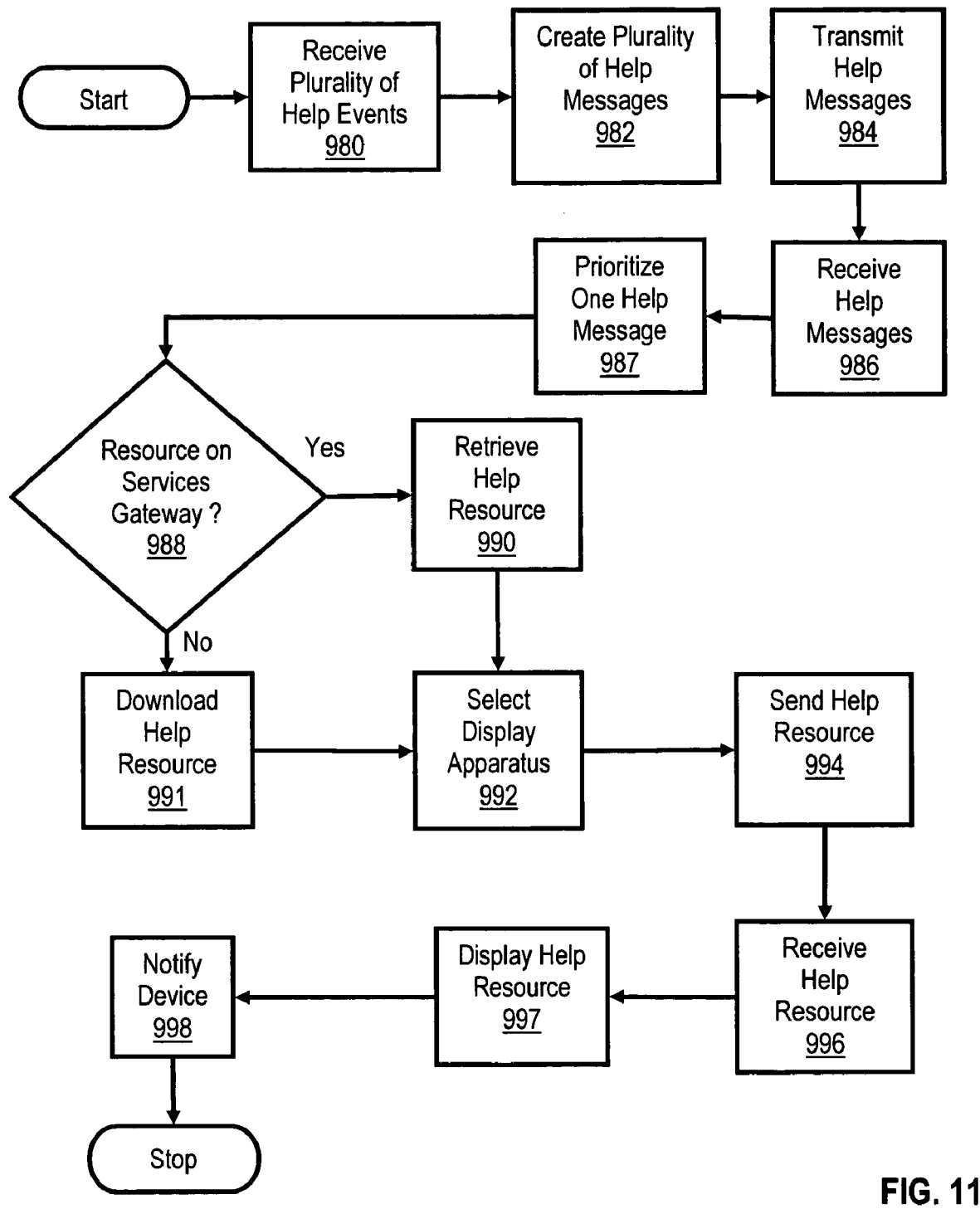
FIG. 11 is a flow chart illustrating another exemplary computer implemented method for displaying a help resource capable of prioritizing one of a plurality of help messages and displaying a help resource associated with the prioritize help message.

Services gateways including help button applications are also capable of accommodating multiple help messages from multiple devices and prioritizing those help messages. FIG. 11 is a flow chart illustrating an exemplary method of displaying a help resource associated with a device on a display apparatus that utilizes a services gateway in accordance with the architecture of FIG. 2.

The method of FIG. 11 includes receiving (980), in a plurality of devices, help events from a plurality of users. As discussed above, a help event is an event that activates help button application programming installed on a device and is typically created by a user engaging a help button installed on the device. Receiving, in a plurality of devices, help events from a plurality of users therefore often includes receiving, in a plurality of devices, help events created as a result of a plurality of user's engaging a plurality of help buttons on the plurality of devices.

The method of FIG. 11 includes creating (982) a plurality of help messages in dependence upon the plurality of help events and transmitting (984) the help messages to a services gateway. In some examples, a help message includes a device ID identifying the device, or a help resource ID identifying a particular help resource associated with the device. In many examples, the help message is transmitted directly to a display apparatus wirelessly using any protocol such as Bluetooth, 802.11, HTTP, WAP, or any other protocol that will occur to those of skill in the art.

The method of FIG. 11 includes receiving (986), in a services gateway, a plurality of help messages created in a plurality of devices. Receiving (986), in a services gateway, a plurality of help messages created in a plurality of devices typically includes creating a queue to store the help messages and adding the plurality of help message to a queue as the help messages are transmitted from the device to the services gateway.

The method of FIG. 11 includes prioritizing (987) one of the plurality of help messages. In some examples of the method of FIG. 11, prioritizing one of the plurality of help messages comprises selecting a help message in dependence upon the position of the message in the queue. In some such embodiments, the help button application installed on the services gateway retrieves help messages first-in-first-out from the queue. In such embodiments, the prioritized help message is the next help message in the queue.

In another example of the method of FIG. 11, prioritizing (987) one of the plurality of help messages includes selecting a help message from the queue in dependence upon a device ID included in the help message. In such examples, help button application programming installed on the services gateway retrieves help messages from the queue in dependence upon a predetermined priority of device IDs. That is, some devices are predetermined to have a higher priority than other devices. Such examples typically include comparing the device IDs of the enqueued help messages with a device priority table or other data structure to identify the enqueued help message with the highest priority device ID and retrieving that help message from the queue.

In another example of the method of FIG. 11, prioritizing (987) one of the plurality of help messages comprises selecting a help message in dependence upon an importance rating included in the help message. In such embodiments, the importance rating is included in the help message when the help message is created in the device. In some embodiments, the value of the importance rating is dependent upon the status of the device. For example, a refrigerator whose thermostat is broken may result in an interior temperature that is above a threshold predetermined to endanger the quality of food contained in the refrigerator. A help message created under such conditions may include an importance rating with a higher value than for example a help message created by a refrigerator whose interior light is broken.

The method of FIG. 11 includes determining (988) whether the resource is on the services gateway. If the help resource is on the services gateway, the method of FIG. 11 includes retrieving (990) the help resource from data storage on the services gateway. In some embodiments, the help resource is retrieved in dependence upon a device ID or resource ID identifying the help resource.

If the help resource is not on the services gateway, the method of FIG. 11 includes downloading (991) the help resource from a network location. In some embodiments, a URL identifying the network location of the help resource is retrieved from the help message and the help resources is downloaded from the network location. Alternatively, if the help resource is not on the service gateway, the method of FIG. 11 includes retrieving the help resource from the help message.

The method of FIG. 11 includes selecting (992) a display apparatus to display the help resource. In some examples, selecting (992) a display apparatus to display the help resource includes selecting a display apparatus in dependence upon the display capabilities of the display apparatus and the display requirements of the help document. One way of selecting display apparatus therefore includes identifying a MIME type of the help resource and selecting a display apparatus that supports the MIME type of the help resource. In other embodiments, selecting a display apparatus includes selecting a display apparatus that is not currently busy. That is, selecting a display apparatus that is not currently displaying a help resource associated with any other device's help message.

The method of FIG. 11 includes sending (994) the help resource to the display apparatus for display, receiving (996) the help resource in the display apparatus, and displaying (997) the help resource. As discussed above, the help resource can be text files, audio files, video files or any other aggregation of information concerning the device. Displaying the help resource, therefore means making the resource available to the user. That is, showing the resource, playing the resource, or any other method of displaying the resource that will occur to those of skill in the art.

The method of FIG. 11 also advantageously includes notifying (998) at least one of the plurality of devices that transmitted a help message that was not prioritized that the display apparatus is busy. Notifying at least one of the plurality of devices that the display apparatus is busy typically includes identifying at least one of the enqueued help messages that is not prioritized, identifying the device associated with that help message, creating a busy message, and transmitting the busy message to at least one of the plurality of devices.

In some examples of the method of FIG. 11, a device receiving a busy message supports some interface capability to alert the user of the busy message. Examples of such alerts include displaying an icon to the user alerting the user that the display apparatus is currently busy, playing an earcon such as a beep or busy signal to alert the user that the display is currently busy, or any other alert that will occur those of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for displaying a help resource associated with a device on a display apparatus, the method comprising:
   receiving, in a services gateway, a help message created in a device as a result of a user engaging a help button installed on the device;
   retrieving, in dependence upon the help message, a help resource associated with the device, wherein retrieving, in dependence upon the help message, a help resource associated with the device comprises:
      retrieving the help resource from data storage on the services gateway, and
      downloading the help resource from a network location;
   selecting a display apparatus to display the help resource, wherein selecting a display apparatus to display the help resource comprises:
      selecting a display apparatus in dependence upon the display requirements of the help resource, and
      selecting a display apparatus in dependence upon the display capabilities of the display apparatus;
   sending the help resource to the display apparatus for display.

2. A computer implemented system for displaying a help resource associated with a device on a display apparatus, the system comprising:
   means for receiving, in a services gateway, a help message created in a device as a result of a user engaging a help button installed on the device;
   means for retrieving, in dependence upon the help message, a help resource associated with the device, wherein means for retrieving, in dependence upon the help message, a help resource associated with the device comprises:
  means for retrieving the help resource from data storage on the services gateway, and
  means for retrieving the help resource from data storage on the services gateway, and
  means for downloading the help resource from a network location;
means for selecting a display apparatus to display the help resource, wherein means for selecting a display apparatus to display the help resource comprises:
  means for selecting a display apparatus in dependence upon the display requirements of the help resource, and
  means for selecting a display apparatus in dependence upon the display capabilities of the display apparatus;
means for sending the help resource to the display apparatus for display.

3. A computer implemented computer program product for displaying a help resource associated with a device on a display apparatus, the computer program product comprising:
  means, recorded on the recording medium, for receiving, in a services gateway, a help message created in a device as a result of a user engaging a help button installed on the device;
  means, recorded on the recording medium, for retrieving, in dependence upon the help message, a help resource associated with the device, wherein means, recorded on the recording medium, for retrieving, in dependence upon the help message, a help resource associated with the device comprises:
    means, recorded on the recording medium, for retrieving the help resource from data storage on the services gateway, and
    means, recorded on the recording medium, for downloading the help resource from a network location;
  means, recorded on the recording medium, for selecting a display apparatus to display the help resource, wherein means, recorded on the recording medium, for selecting a display apparatus to display the help resource comprises:
    means, recorded on the recording medium, for selecting a display apparatus in dependence upon the display requirements of the help resource, and
    means, recorded on the recording medium, for selecting a display apparatus in dependence upon the display capabilities of the display apparatus;
  means, recorded on the recording medium, for sending the help resource to the display apparatus for display.

* * * * *